United States Patent Office. 

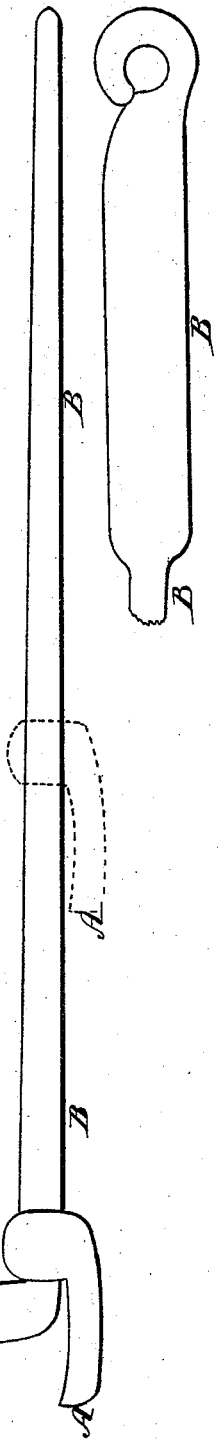

WILLIAM CLEGG, OF PHILADELPHIA, PENNSYLVANIA.

Letters Patent No. 86,505, dated February 2, 1869.

POKER AND LID-LIFTER COMBINED.

Schedule referred to in these Letters Patent and making part of the same.

Be it known that I, WILLIAM CLEGG, of the city of Philadelphia, and State of Pennsylvania, have invented a new and improved Instrument or Tool for Lifting the Lids and Tops of Ranges and Stoves, and other Lids, when combined with a Poker, as described; and I hereby declare that the following is a full and exact description thereof, reference being had to the accompanying drawings, like letters indicating like parts.

The nature of my invention consists of a movable lip or projection, A, called a lifter, attached to or sliding on an ordinary poker, B B, so that it may be slid or moved back out of the way when raking the fire, and yet easily moved forward for use, when wanted for a lifter, without laying down or changing for another tool.

What I claim is, not the poker or the lifter separately, but the two combined or united, sliding one on the other, as shown in the accompanying drawings.

WILLIAM CLEGG.

Witnesses:
JAMES CALLAGHAN,
EDWARD MAKIN.